(12) United States Patent
Sabatier et al.

(10) Patent No.: US 11,846,694 B2
(45) Date of Patent: Dec. 19, 2023

(54) OBSTACLE DETECTION AND CHARACTERISATION

(71) Applicant: SAGEMCOM BROADBAND SAS, Rueil Malmaison (FR)

(72) Inventors: Pierre Sabatier, Rueil Malmaison (FR); Patrick Berthele, Rueil Malmaison (FR)

(73) Assignee: SAGEMCOM BROADBAND SAS, Rueil Malmaison (FR)

(*) Notice: Subject to any disclaimer, the term of this patent is extended or adjusted under 35 U.S.C. 154(b) by 0 days.

(21) Appl. No.: 17/837,743

(22) Filed: Jun. 10, 2022

(65) Prior Publication Data

US 2022/0397657 A1   Dec. 15, 2022

(30) Foreign Application Priority Data

Jun. 11, 2021 (FR) ...................... 2106206

(51) Int. Cl.
| | |
|---|---|
| *G01S 11/06* | (2006.01) |
| *G01B 21/08* | (2006.01) |
| *G01P 15/14* | (2013.01) |
| *G01P 15/18* | (2013.01) |
| *H04B 1/7163* | (2011.01) |

(52) U.S. Cl.
CPC .............. *G01S 11/06* (2013.01); *G01B 21/08* (2013.01); *G01P 15/14* (2013.01); *G01P 15/18* (2013.01); *H04B 1/7163* (2013.01)

(58) Field of Classification Search
None
See application file for complete search history.

(56) References Cited

U.S. PATENT DOCUMENTS

| | | | |
|---|---|---|---|
| 2008/0157957 A1 | 7/2008 | Pitchers et al. | |
| 2012/0235849 A1* | 9/2012 | Tatoian ................. | G01S 13/888 342/21 |
| 2017/0011091 A1* | 1/2017 | Chehreghani ....... | G06F 16/2455 |
| 2020/0064446 A1* | 2/2020 | Chan .................... | H04B 17/318 |

(Continued)

OTHER PUBLICATIONS

Tian et al., "An INS and UWB Fusion Approach With Adaptive Ranging Error Mitigation for Pedestrian Tracking" Apr. 15, 2020, downloaded from https://ieeexplore.ieee.org/stamp/stamp.jsp?tp=&arnumber=8950345 on Dec. 20, 2022 (Year: 2020).*

(Continued)

*Primary Examiner* — Michael J Dalbo
*Assistant Examiner* — Denise R Karavias
(74) *Attorney, Agent, or Firm* — Muncy, Geissler, Olds & Lowe, P.C.

(57) ABSTRACT

Obstacle detection and characterisation method, including the steps of: acquiring a first distance measurement obtained from at least one inertial measurement produced by at least one inertial sensor of a mobile terminal, and a second distance measurement obtained from at least one time of flight measurement; evaluating a distance error representative of a difference between the second distance measurement and the first distance measurement; from the distance error, detecting the presence of an obstacle between the mobile terminal and the reference equipment, and determining one or more characteristics of said obstacle.

15 Claims, 8 Drawing Sheets

(56) References Cited

U.S. PATENT DOCUMENTS

2021/0037498 A1* 2/2021 Soma ................ H04B 17/27
2022/0078575 A1* 3/2022 Raveendran .......... H04L 67/535

OTHER PUBLICATIONS

Silva et al., "An Approach to Improve Location Accuracy in Non-Line-of-Sight Scenarios using Floor Plans" 2019, downloaded from https://ieeexplore.ieee.org/stamp/stamp.jsp?tp=&arnumber=8972048 on Dec. 20, 2022 (Year: 2019).*

Aqili et al., "Determination of thickness, refractive index, and thickness irregularity for semiconductor time films from transmission spectra" Jan. 1, 2002, https://link.springer.com/article/10.1007/s10762-007-9217-9 on Jan. 5, 2020 (Year: 2002).*

Piesiewicz et al., "Properties of Building and Plastic Materials in the THz Range" Mar. 22, 2007 downloaded from htttps:// link.springer.com/content/pdf/10.1007/s10762-007-9217-9.pdf?pdf=button on Jan. 5, 2023 (Year: 2007).*

Tian et al., "An INS and UWB Fusion Approach With Adaptive Ranging Error Mitigation for Pedestrian Tracking," IEEE Sensors Journal, vol. 20, No. 8, Apr. 15, 2020, pp. 4372-4381, 10 pages.

Silva et al., "An Approach to Improve Location Accuracy in Non-Line-of-Sight Scenarios using Floor Plans," 2019 IEEE 17th International Conference on Industrial Informatics, vol. 1, Jul. 22, 2019, pp. 1715-1718, 4 pages.

\* cited by examiner

OBSTACLE DETECTION AND CHARACTERISATION

The invention relates to the field of radio signal propagation mapping (Wi-Fi signals, for example).

BACKGROUND OF THE INVENTION

A distributed Wi-Fi system makes it possible to implement a meshed local network which has an extended coverage.

Such a distributed Wi-Fi system comprises a plurality of nodes which communicate together via a so-called "backhaul" connection, which uses, for example, a Wi-Fi radio link or an Ethernet wired link.

The backhaul connection makes it possible for the nodes to exchange commands, in particular management commands, through a communication bus. The backhaul connection also serves as a support for the different dataflows between the nodes and the network.

Each of the nodes integrates at least one so-called "fronthaul" Wi-Fi access point, making it possible for an external equipment item to communicate with the network.

One of the nodes of the distributed Wi-Fi system is a carrier of a "master" functionality. The master node has the purposes of managing the distributed Wi-Fi system, in particular its architecture, and of forcing each external equipment item connected to the local network to communicate with one of the fronthaul access points of one of the nodes according to the local characteristics for propagating Wi-Fi signals.

The positions of the nodes and the characteristics of emitting Wi-Fi signals are not always defined optimally relative to the space that must cover the network. In particular, if the access points are positioned arbitrarily in a dwelling by a user who is novice in this regard, the coverage is not optimised.

Therefore, it is considered to quantify the propagation of the radio signals produced by the access points, so as to produce a mapping of the connection quality in the dwelling. The map produced can be used to configure the access points of the network, such that the space to be mapped is covered as effectively as possible.

However, a dwelling comprises numerous obstacles which have a significant impact on the propagation of the radio signals. Solid walls (concrete, brick), in particular, constitute major obstacles. Yet, there is currently no simple, effective and inexpensive method to detect and characterise the obstacles in a dwelling (or in any other building), which represents a significant hindrance in implementing the Wi-Fi coverage mapping.

OBJECT OF THE INVENTION

The invention aims to improve radio signal propagation mapping (Wi-Fi, for example).

SUMMARY OF THE INVENTION

In view of achieving this aim, an obstacle detection and characterisation method is proposed, comprising the steps of:
acquiring at least one pair of measurements, each pair of measurements being associated with a current position of a mobile terminal and comprising a first distance measurement and a second distance measurement between said mobile terminal and a reference equipment item, each first distance measurement being obtained from at least one inertial measurement produced by at least one inertial sensor of the mobile terminal, each second distance measurement being obtained from at least one time of flight measurement;
for each pair of measurements:
evaluating a distance error representative of a difference between the second distance measurement and the first distance measurement of said pair of measurements;
from the distance error, detecting the presence of an obstacle between the mobile terminal and the reference equipment item, and determining one or more characteristics of said obstacle.

The obstacle detection and characterisation method according to the invention therefore utilises the difference between the second distance measurements, obtained from time of flight measurements, and the first distance measurements, obtained from inertial measurements, to detect obstacles (for example, walls) and evaluating characteristics (physical and structural) of said obstacles.

The detection of obstacles makes it possible to very significantly improve the quality of the radio signal propagation mapping.

The obstacle detection and characterisation method is very effective, but also very simple to achieve and very inexpensive to implement, since it only requires a reference equipment item (for example, a residential gateway) and a mobile terminal (for example, a smartphone).

The invention is particularly clever: it uses the fact that, when a radio signal passes through a foreign environment, it is slowed down by the refraction phenomenon, such that the time of flight is extended, which causes an "interfering" extension of the distance measured. The obstacle detection and characterisation method utilises this interfering extension to detect and characterise the obstacle.

In addition, an obstacle detection and characterisation method is proposed, such as described above, wherein the time of flight measurements use UWB signals, the reference equipment item integrating a UWB anchor.

In addition, an obstacle detection and characterisation method is proposed, such as described above, further comprising the step of comparing the distance error with a predetermined threshold, and of detecting the presence of the obstacle if the distance error is greater than the predetermined threshold.

In addition, an obstacle detection and characterisation method is proposed, such as described above, wherein the obstacle is a wall and wherein the characteristics of the obstacle comprise an indication according to which the wall is a hollow wall or a solid wall and/or a refraction index of the wall and/or a material with which the wall and/or a thickness of the wall has been built.

In addition, an obstacle detection and characterisation method is proposed, such as described above, further comprising the steps of:
acquiring a previously defined thickness value and likely to correspond to the thickness of the wall;
calculating an approximate refraction index of the wall from the previously defined thickness value and from the distance error;
determining, in a table containing a plurality of predefined refraction indices, each associated with a predefined material, a consolidated refraction index which is the closest to the approximate refraction index, and by deducing the material with which the wall has been built.

In addition, an obstacle detection and characterisation method is proposed, such as described above, wherein the determination of the consolidated refraction index consists of determining, from among the predefined refraction indices, a particular predefined refraction index which minimises a function representative of a distance between the approximate refraction index and the predefined refraction indices of the table.

In addition, an obstacle detection and characterisation method is proposed, such as described above, wherein the distance is a Euclidean distance. In addition, an obstacle detection and characterisation method is proposed, such as described above, further comprising the step of evaluating an actual thickness of the wall from the distance error and from the consolidated refraction index.

In addition, an obstacle detection and characterisation method is proposed, such as described above, further comprising the step, if no obstacle is detected between the mobile terminal and the reference equipment, of readjusting the first distance measurement over the second distance measurement.

In addition, an obstacle detection and characterisation method is proposed, such as described above, wherein the determination of the second distance measurement comprises the steps:
of acquiring a UWB signal;
of detecting a first peak of the UWB signal by using a time window centred on a reference time obtained from the first distance measurement;
of producing the second distance measurement from a occurrence time of the first peak.

In addition, an obstacle detection and characterisation method is proposed, such as described above, further comprising an initialisation step consisting of defining a point of origin of the first distance measurements and of the second distance measurements, the point of origin being defined when the current position of the mobile terminal is a reference position, wherein the reference equipment is located.

In addition, an obstacle detection and characterisation method is proposed, such as described above, comprising the step of positioning, by a user, the mobile terminal in the reference position to define the point of origin.

In addition, an obstacle detection and characterisation method is proposed, such as described above, comprising the step of automatically detecting that the mobile terminal is located in the reference position to define the point of origin.

In addition, an obstacle detection and characterisation is proposed, such as described above, wherein the mobile terminal is a smartphone.

In addition, an obstacle detection and characterisation method is proposed, such as described above, wherein the reference equipment is a residential gateway.

In addition, a mobile terminal is proposed comprising a localisation unit arranged to produce the first distance measurements, a time of flight measuring unit arranged to produce the second distance measurements, and a processing unit wherein is implemented the obstacle detection and characterisation method, such as described above.

In addition, a computer program comprising instructions which cause the processing unit of the mobile terminal is proposed, such as described above, to execute the steps of the obstacle detection and characterisation method, such as described above.

In addition, a recording support which can be read by a computer is proposed, on which the computer program such as described above is recorded.

The invention can be better understood in the light of the following description of a particular, non-limiting embodiment of the invention.

BRIEF DESCRIPTION OF THE DRAWINGS

Reference will be made to the appended drawings, from among which.

DETAILED DESCRIPTION OF THE INVENTION

The invention is here implemented in a system comprising a reference equipment item and a mobile terminal.

Figure 1:
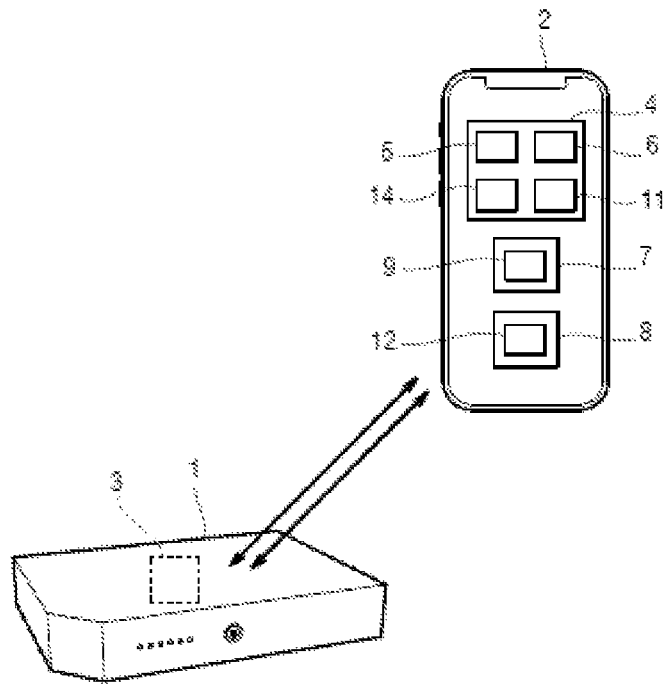
FIG. 1 represents a residential gateway and a smartphone.
Figure 2:
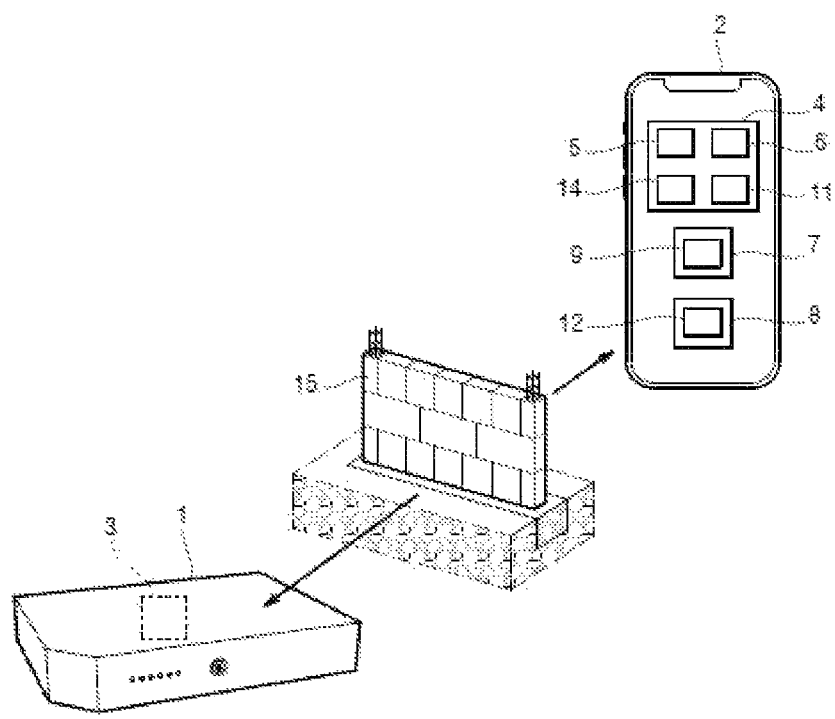
FIG. 2 represents the residential gateway, the smartphone and a wall positioned between the residential gateway and the smartphone.

In reference to FIGS. 1 and 2, the reference equipment is fixed and is here a residential gateway 1. The mobile terminal is here a smartphone 2.

The residential gateway 1 comprises a UWB anchor 3 comprising a module for emitting and receiving UWB (Ultra Wide Band) signals.

The smartphone 2 comprises a processing unit 4. The processing unit 4 here comprises a plurality of processing components, from among which at least one first processing component 5 adapted to execute instructions of a program to implement the obstacle detection and characterisation method according to embodiments. The program is here a local application.

The program is stored in a memory 6 integrated in or connected to the first processing component 5. The first processing component 5 is, for example, a conventional processor, a microcontroller, a DSP (Digital Signal Processor), or a programmable logic circuit such as an FPGA (Field Programmable Gate Array) or an ASIC (Application Specific Integrated Circuit).

The smartphone 2 also comprises a localisation unit 7 and a time of flight measuring unit 8 (or TOF for Time of Flight).

The localisation unit 7 provides a relative geometric localisation of the smartphone 2. In an embodiment, the localisation unit 7 comprises inertial sensors comprising here a three-axis accelerometer, a three-axis gyrometer and a three-axis compass. The inertial sensors are integrated in one same inertial measuring component 9 (for example, the LSM9DS1 from STMicroelectronics). The localisation unit 7 also comprises a calculation software module integrated in a second processing component 11 of the processing unit 4 and intended to implement an inertial calculation method.

The inertial measuring component 9 and the second processing component 11 of the processing unit 4 are connected here by a series connection (for example, by an I²C bus). In other examples, the localisation unit 7 comprises a relatively simple structural inertial sensor only comprising one accelerometer or only comprising one gyrometer.

The localisation unit 7 therefore produces first distance measurements between the residential gateway 1 and the smartphone 2, which are obtained from inertial measurements produced by the inertial measuring component 9 of the smartphone 2.

The unit for measuring time of flight 8 comprises a method for emitting and receiving UWB signals 12 and a third processing component 14 integrated in the processing unit 4. The unit for measuring time of flight 8 engages with the UWB anchor 3 of the residential gateway 1 to take time of flight measurements which are themselves used to produce second distance measurements between the smartphone 2 and the residential gateway 1. Here, the frequency of operation of the UWB modules for measuring TOF is equal to 4 GHz (but it could, of course, be different).

The time of flight measurements therefore use UWB signals. The DECAWAVE MDEK1001 localisation solution is implemented here. The module for emitting and receiving UWB signals 12 is, for example, the DECAWAVE DW1000 component.

The third processing component 14 is, for example, the NORDIC microcontroller containing a DECAWAVE firmware making it possible to utilise the DECAWAVE DW1000 component. The two components communicate together via a series connection.

The second distance measurements are based on the knowledge of a time of flight of UWB signals exchanged with the UWB anchor 3 of the residential gateway 1. The unit for measuring time of flight 8 also produces a measurement of the attenuation of the electromagnetic signal received from the UWB anchor 3.

The smartphone 2 is thus moved by a user in a certain space, for example in the dwelling of the user, to detect and evaluate the nature of obstacles present in said space. The obstacles comprise, for example, a wall 15, a partition, etc.

In the system which has just been described, it is therefore the smartphone 2 which takes the first (inertial) distance measurements and the second distance measurements (through time of flight measurements).

It will be noted that the time of flight measurements and the second distance measurements can also be taken by the UWB anchor 3 of the residential gateway 1. These distance measurements must be communicated to the local application of the smartphone 2 which also acquires the relative geometric localisation information (and in particular, the first distance measurements).

The obstacle detection and characterisation method according to the embodiments starts with an initialisation step, which consists of defining a point of origin of the first distance measurements and of the second distance measurements. The point of origin is defined when the current position of the smartphone 2 is the reference position, wherein the residential gateway 1 is located.

To define the point of origin, the local application positions, by the user, the smartphone 2 in the reference position, i.e. on the residential gateway 1.

The user thus initialises the obstacle detection and characterisation method by pressing a button of the local application.

Alternatively, the residential gateway 1 and/or the smartphone 2 can, to define the point of origin, automatically detect that the smartphone 2 is located in the reference position of the residential gateway 1. This automatic detection is made, for example, from distance measurements obtained via the analysis of the force of a radio signal received. RSSI (Received Signal Strength Indication) measurements can be used.

The localisation unit 7 is thus reinitialised at its origin, and is subsequently capable at each instant of geometrically positioning the smartphone 2 relative to the point of origin. Pressing a button on the local application makes it possible to put all of the parameters of the inertial measuring component 9 in the memory. These parameters will serve as a starting point in the integration of the parameters. The localisation unit 7 can thus calculate first distance measurements, which measure the geometric absolute distance separating the smartphone 2 from the point of origin.

As in any inertial navigation system, the movements are measured by difference from a point A to a point B by using the 3D linear acceleration and the 3-axis rotation acceleration by double integration to reach the position of the point B from the point A.

Incidentally, these measurements can be completed by the compass measurement which is an absolute measurement of the rotation (since relative to a magnetic north).

The absolute distance is therefore deduced by the integration of the acceleration, gyrometer and compass parameters according to the general principle of inertial navigation.

Also, when the smartphone 2 undergoes a movement along the axis Z, it is possible to correlate it with the pressure measurement which absolutely records the height.

The time of flight measuring unit 8 makes it possible to verify that the smartphone 2 is correctly positioned on the point of origin (TOF distance=0).

Subsequently, according to the movement of the user leading to the bypassing of the obstacles, and cyclically (every second, for example), the two distances, geometric (first distance measurement) and TOF (second distance measurement), separating the smartphone 2 and the residential gateway 1, are calculated by the local application embedded in the smartphone 2.

The processing unit 4 of the smartphone 2 thus regularly acquires pairs of measurements. Each pair of measurements is associated with a current position of the smartphone 2, and comprises a first distance measurement and a second distance measurement.

As has been seen, the first distance measurements are produced by the smartphone 2 via the inertial measurement sensor 9. Each first distance measurement is obtained from the format x1, y1, z1 of position in the space which can be converted into distance in cm, having a precision of around a few centimetres. This level of precision is satisfactory in this context, as it makes it possible to deduce a difference which is therefore produced by an operation difference.

The second distance measurements are presented in the format of a length in cm and have a precision of around one centimetre. Again, this level of precision is satisfactory in this context, as the operation difference in the wall is greater than the measurement error of the UWB distance.

Figure 3:
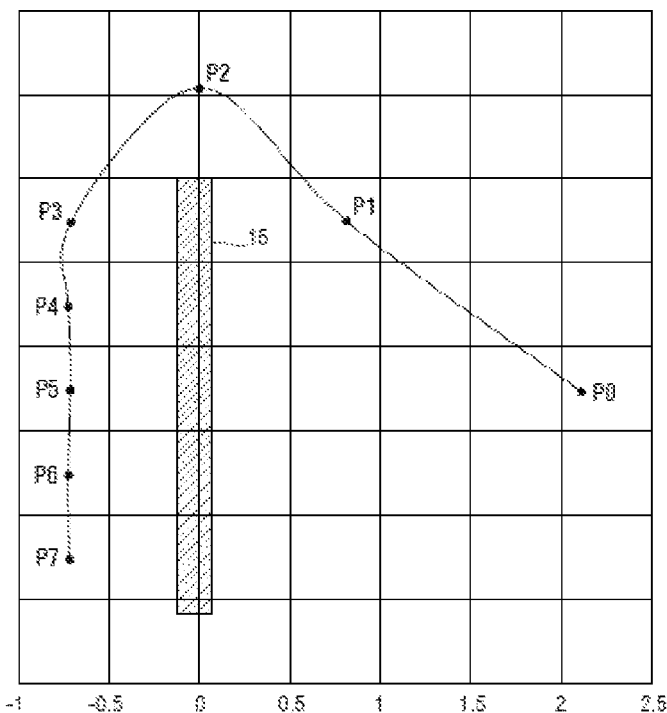
FIG. 3 represents the pathway around the wall of a user provided with the smartphone.

The pathway of the user provided with the smartphone 2 is seen in FIG. 3, which starts from the point of origin P0 and, by passing through the points P1 to P7, bypasses the wall 15.

By starting from the residential gateway 1 (position P0) then by extending from it, the user and therefore the smartphone 2 are first in "line of sight" ("LOS").

The second distance measurement (TOF), under these conditions, is simple to take and very precise.

However, as soon as an obstacle forming an absorbing media is interleaved on the direct line between the smartphone 2 and the residential gateway 1 (the wall 15, from the point P3), the second distance measurement is extended by the refraction effect of the material with which the wall is built, which slows down the radio wave passing through it. The first (geometric) distance measurement remains representative of reality.

Figure 4:
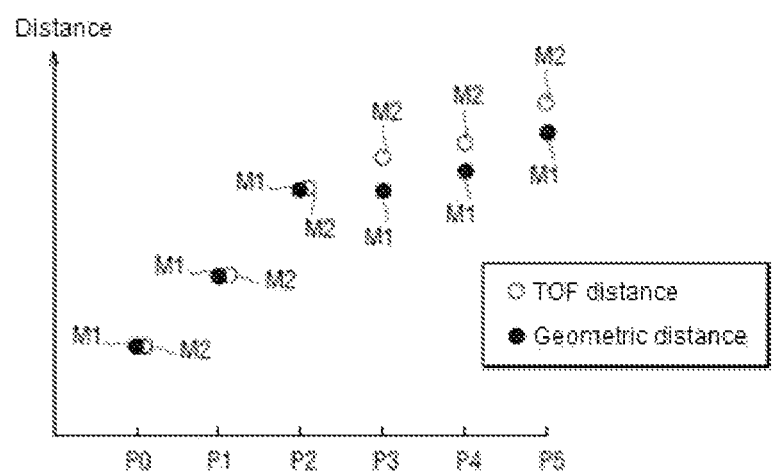
FIG. 4 is a graph which represents, for different current positions of the smartphone, a first distance measurement obtained from inertial measurements and a second distance measurement obtained from time of flight measurements.
Figure 5:
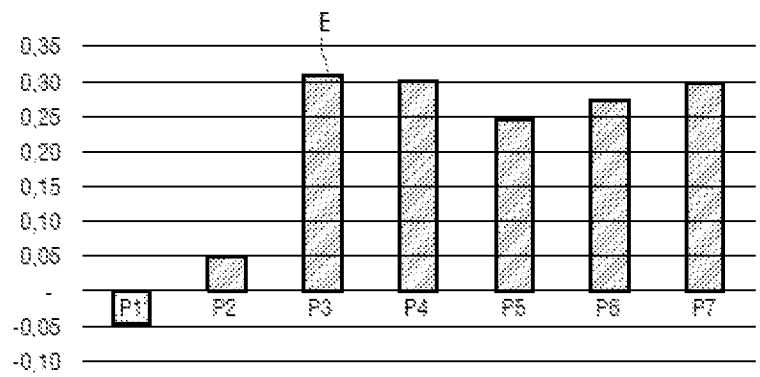
FIG. 5 is a graph which represents, for each current position, the measurement error between the second distance measurement and the first distance measurement.

It is seen in FIGS. 4 and 5 that, while no obstacle is present between the residential gateway 2 and the smartphone 1, the first distance measurements M1 and the second distance measurements M2 are substantially identical. In FIG. 5, it is seen that the distance error E, equal here to a difference between the second distance measurement and the first distance measurement, is very low at the points P1 and P2.

However, when the smartphone 2 has been moved such that the wall 15 is positioned between the residential gateway 1 and the smartphone 2, the distance error E increases (from the point P3).

The processing unit 4 of the smartphone 2 therefore acquires the first distance measurements and the second distance measurements. For each pair of measurements comprising a first distance measurement and a second distance measurement, the processing unit 4 evaluates the distance error E representative of the difference between the second distance measurement and the first distance measurement of said pair of measurements. Here, the distance error E is equal to the difference between the second distance measurement and the first distance measurement.

The processing unit 4 thus detects, from the distance error E, the presence of an obstacle between the smartphone 2 and the residential gateway 1, and evaluates one or more characteristics of said obstacle.

Thus, the processing unit 4 of the smartphone 2 can compare the distance error E with a predetermined threshold, and detects the presence of an obstacle if the distance error is greater than the predetermined threshold.

The value of the predetermined threshold is chosen according to the precision of the distance measurements.

The localisation of the inertial navigation, and therefore the first distance measurement, has a precision of around a few centimetres.

The precision of the second distance measurement (TOF with UWB) is around one centimetre.

A solid wall of 20 cm with a refraction index of around 3 leads to a path increase of 40 cm relative to the equivalent distance in the air.

A predetermined threshold equal to 20 cm±5 cm is chosen. This value is relevant, as it is greater than the sum of the precisions of the first distance measurement and of the second distance measurement, while being less than the increase of path due to the wall and impacting the second distance measurement.

Then, the processing unit 4 determines one or more characteristics of the obstacle from the distance error. In the case of a wall, the characteristics comprise: an indication according to which the wall is a hollow wall or a solid wall, the refraction index of the wall, the material with which the wall has been built, and the thickness of the wall. It is noted that the processing unit 4 could settle for determining one or more characteristics only from among these characteristics.

It is noted that the angle of incidence on an obstacle of the wave (here, the UWB signal) used for the second distance measurement, has little impact.

Figure 6:
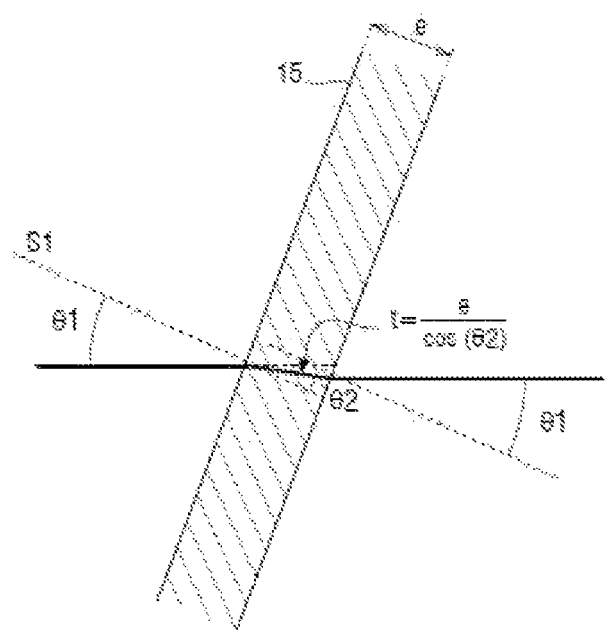
FIG. 6 represents a radio signal penetrating in a wall with a certain angle of incidence.
Figure 7:
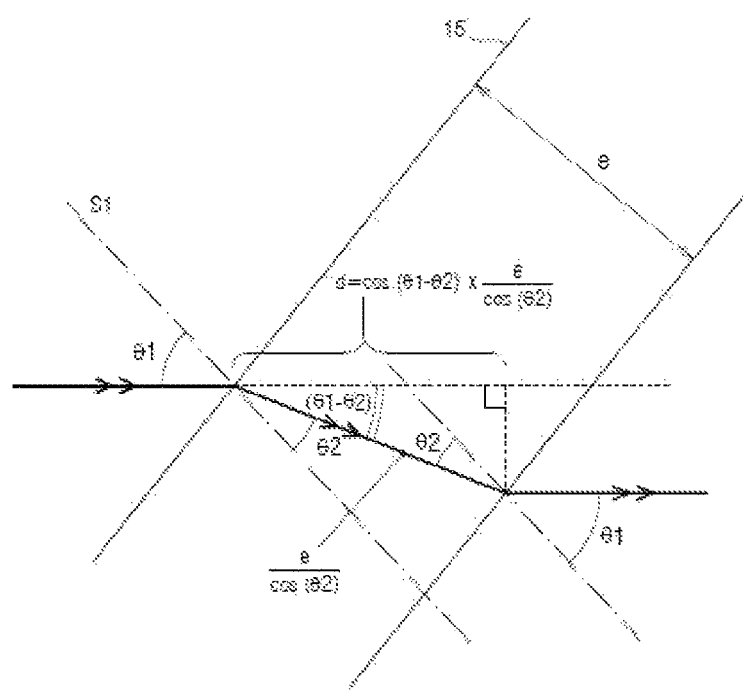
FIG. 7 is a figure similar to FIG. 6, but more precise.

In FIGS. 6 and 7, the wall 15, of thickness e, is modelled by a strip with parallel faces. The wall 15 does not change the direction of the UWB signal, but produces a lateral difference of the UWB signal.

The path, in the wall 15, of a signal penetrating in the wall 15 with an angle of incidence equal to 90°, has a length equal to e, i.e. to the thickness of the wall 15.

The path t, in the wall 15, of a signal Si penetrating in the wall 15 with an angle of incidence equal to $\theta 1$ and a refraction angle equal to $\theta 2$, has the length of:

$$t = e/\cos(\theta 2).$$

The distance d is equal to:

$$d = \cos(\theta 1 + \theta 2) \times e/\cos(\theta 1).$$

Figure 8:
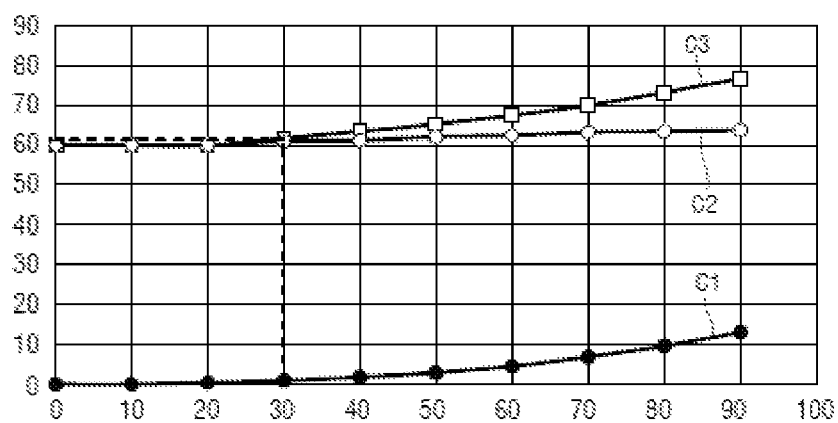
FIG. 8 is a graph comprising curves representative of the operation of the radio signal in the wall according to the angle of incidence.

FIG. 8 corresponds to a situation wherein the wave progresses into a wall having a thickness of 20 cm and a refraction index equal to 3. The optical path has a length equal to 60 cm for an angle of incidence of 0°.

The curve C1 represents the variation of the length of the optical path according to the angle of incidence $\theta 1$.

The curve C2 represents the length of the path into the material according to the angle of incidence, and the curve C3, the sum of the two curves C1 and C2.

The error is 13 cm as a maximum in grazing incidence over the total distance in the air.

The angle of incidence $\theta 1$ therefore introduces a maximum TOF measurement error of around 15 cm (in grazing incidence) and in practice, less than 10 cm in most cases, compared with the extension of paths (distance difference) in the material which can be, for a concrete block wall, of 40 cm.

It is also noted that, when no obstacle is detected, i.e. in LOS situation, the processing unit 4 (or, more specifically, the local application software), can readjust the first distance measurement over the second distance measurement.

Indeed, the second distance measurement is considered absolute, while the first distance measurement is based on an integration of the measurements produced by the inertial measuring component 9. The second distance measurement is therefore more precise.

The readjustment method here uses spherical coordinates.

Indeed, the hypothesis is made that the angles θ and φ do not change.

Thus, from a second distance measurement DUWB coming from the UWB measurement, the new coordinates of the smartphone $x_1$, $y_1$, $z_1$ can be deduced in the following way:

$$x_1 = DUWB * \sin \varphi * \cos \theta$$

$$y_1 = DUWB * \sin \varphi * \cos \theta$$

$$z_1 = DUWB * \cos \varphi$$

Interest is now taken in a concrete example of an implementation of the obstacle detection and characterisation method according to the embodiments.

Solid walls are focused on here (bearing walls, for example), as the impact on the UWB signals (and on radio signals, generally) of the hollow walls, such as those which comprise two plasterboards, is relatively reduced. Indeed, it is the total thickness of the materials of a wall which must be considered to evaluate the impact of this wall.

For a hollow partition having a thickness of around 10 cm, and comprising two plasterboards, each having a thickness of 13 mm (BA13), as well as a space for separating these two plasterboards filled by honeycomb cardboard, only the two plasterboards count in the attenuation and the slowing down of UWB-type signals, that is 2×13 mm=26 mm of material to consider.

The impact of a hollow partition is therefore very low relative to that of a solid wall, the thickness of which is around 200 mm.

The user and therefore the smartphone 2 are first in "line of sight" ("LOS").

Figure 9:
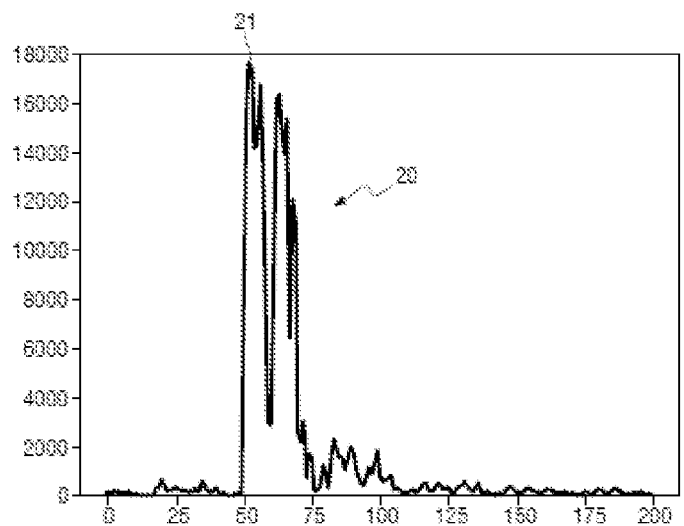
FIG. 9 represents a UWB signal received by the smartphone, while no obstacle is located between the smartphone and the residential gateway.

The UWB signal 20 received by the smartphone after having been emitted by the UWB anchor 3 of the residential gateway 1 is seen in FIG. 9. The X axis is time and the Y axis corresponds to relative signal receiving intensities.

The UWB signal 20 comprises a first peak 21 which is followed by a set of peaks which correspond to the different reflections. The first peak 21 emerges clearly from the other peaks which come from various interfering reflections, but which arrive later than the first peak 21.

In this case, the first peak 21 is the most powerful and serves to determine the time of flight, and therefore to produce the first distance measurement. Only the first peak 21 is useful to measure, as it is this which gives the actual distance.

The processing unit 4 of the smartphone 2 deduces the first distance measurement of these coordinates.

Then, the user bypasses the wall 15.

Figure 10:
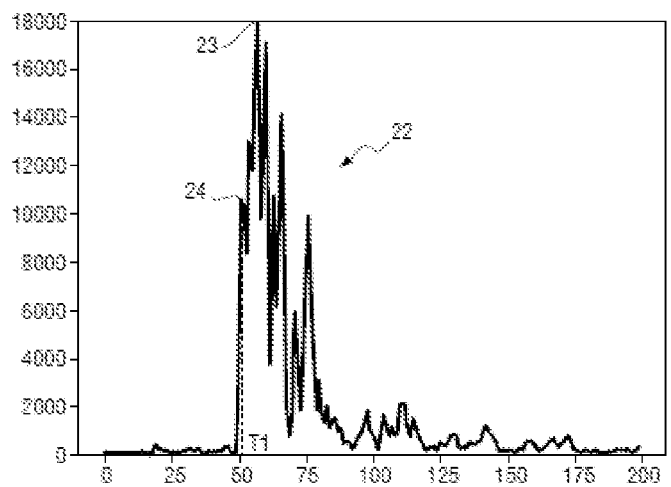
FIG. 10 represents a UWB signal received by the smartphone, while a wall is located between the smartphone and the residential gateway.

The UWB signal 22 received by the smartphone 2 is seen in FIG. 10.

The peak 23 has the greatest intensity.

However, it is the first peak 24, which corresponds to the signal refracted by the wall, which is used for the second distance measurement. The refracted signal is that which arrives first relative to the other reflected signals, as these travel a greater distance. The first peak 24 undergoes an attenuation during the passage behind the wall, but also undergoes a delay due to the propagation in the material (slowing down of the signal by refraction).

Algorithms included in the UWB measurement by the DECAWAVE/QORVO component, make it possible to threshold, for example with a multiplicative value of the noise threshold, which makes it possible to focus on the refracted signal (and therefore to detect the first peak 24), even if this arrives with a lower intensity.

As the path taken by the user between the point is relatively slow (walking), the first peak 24 can be detected in real time via a time window centred on the first distance measurement.

To determine the second distance measurement, the processing unit 4 therefore acquires the UWB signal 22, then detects the first peak 24 of the UWB signal 22 by using a time window centred on a reference time T0 obtained from the first distance measurement. The processing unit 4 thus produces the second distance measurement from an occurrence time T1 of the first peak 24.

This time window is therefore registered on a window (T0+/−ε) around the distance estimate from point to point between the smartphone and the residential gateway, obtained by the inertial navigation of the smartphone 2.

This window device makes it possible to complete already-known algorithms, like for example those described in application note, "DECAWAVE—APS006 PART 3 APPLICATION NOTE".

Moreover, the "optical" aspect of the propagation of the UWB wave leads to a slowing down of the wave in the material.

Not only an attenuation is therefore observed, as seen above, but also an offsetting of the peak towards the highest distance values.

The processing unit 4 therefore compares the UWB distance with the distance obtained by inertial navigation.

The following list corresponds to different points (P1, P2, . . . , P6) through which the user provided with the smartphone 2 passes, as well as the first distance measurements, the second distance measurements and, for each pair of measurements comprising a first distance measurement and a second distance measurement, the corresponding distance error:

P1: 1.65; 1.6; −0.05
P2: 2.77; 2.91; 0.14
P3: 2.99; 3.3; 0.31
P4: 2.88; 3.18; 0.30
P5: 2.82; 3.07; 0.25
P6: 2.88; 3.15; 0.27

Figure 11:
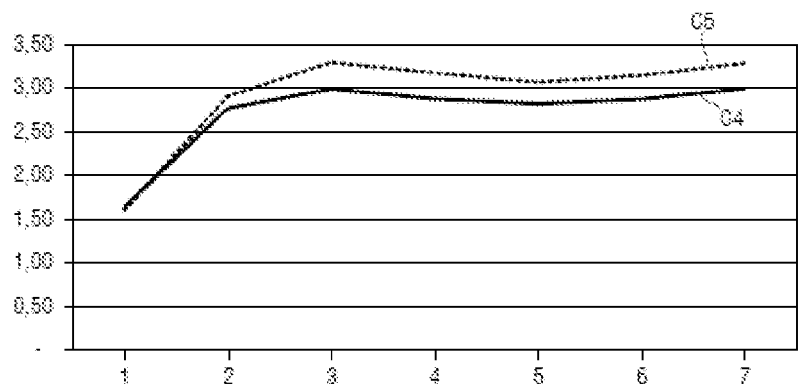
FIG. 11 is a graph comprising a curve of first distance measurements and a curve of second distance measurements, according to the current position of the smartphone.

A curve C4 of the first distance measurements and a curve C5 of the second distance measurements are seen in FIG. 11.

Before the wall, the distance error is almost zero (almost at the measurement errors). After the wall, the second distance measurement is jeopardised by an error of around +30 cm.

The distance error makes it possible to evaluate characteristics of the obstacle (the wall). Abacuses are used, which make it possible to determine the nature of the walls: drywalls (dry plasterboard BA13-type partitions), brick wall, reinforced concrete wall, etc.

To determine the characteristics of the wall from the distance error, the processing unit 4 acquires a thickness value defined beforehand and likely to correspond to the thickness of the wall. This value is a memorised value, which is, for example, stored in the memory 6 of the processing unit 4, or in a memory of the residential gateway 1, or in the cloud, etc.

The thickness value defined beforehand corresponds to the most probable thickness of the wall in a dwelling such as that of the user.

Here, the thickness value defined beforehand corresponds to the thickness of a standard wall, that is 20 cm.

The processing unit 4 calculates an approximate refraction index of the wall from the thickness value defined beforehand and from the distance error. The processing unit 4 determines, in a table comprising a plurality of predefined refraction indices, each associated with a predefined material, a consolidated refraction index which is closest to the approximate refraction index. The processing unit 4 deduces from it, the material with which the wall has been built. The table is, for example, similar to the table 30 of FIG. 12. This table 30 is predefined and memorised.

To calculate the approximate refraction index of the wall, the processing unit 4 uses the formula:

$$\Delta d = W \times (R-1),$$

where $\Delta d$ is the distance error, W is the thickness value defined beforehand of the wall, and R is the approximate refraction index.

This formula is obtained as follows.

Figure 13:
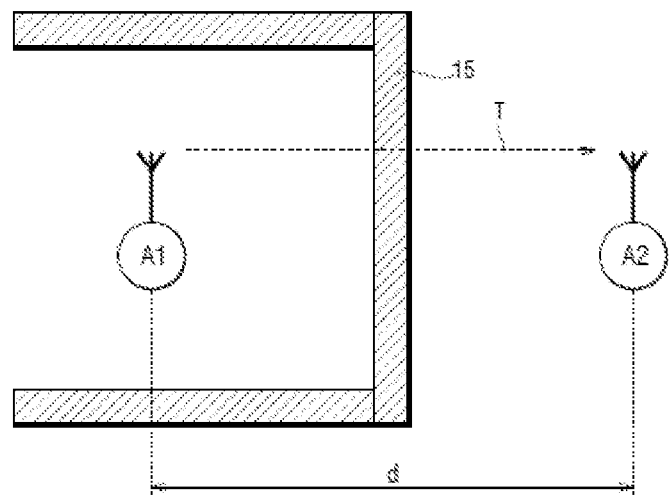
FIG. 13 represents two equipment items separated by a wall, and the direct path of a UWB signal.

In reference to FIG. 13, this is the case of the NLOS (Non Line Of Sight). A UWB signal is emitted by the equipment A1 and received by the equipment A2. A wall 15 is located between the equipment A1 and the equipment A2. The equipment A2 is positioned at a distance d of the equipment A1. The direct path is the path T. The propagation of the UWB signal is disrupted. This disruption is conveyed, in particular, by an attenuation of the first peak in the UWB signal received, which serves to determine the actual distance.

Figure 14:
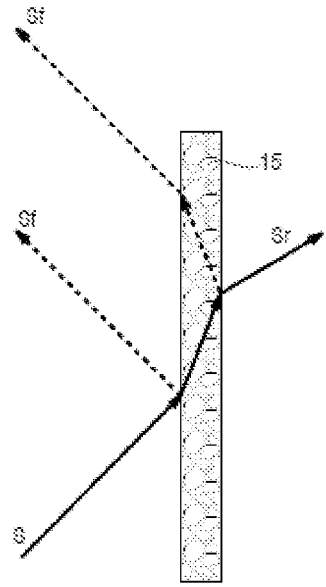
FIG. 14 represents the UWB signal of FIG. 13 passing through the wall.

The refracted signal Sr and the reflected signals Sf coming from the crossing of the wall 15 by the UWB signal S are distinguished in FIG. 14. The direct path passes directly into the wall, as an optical path would do in a glass slide.

During the crossing of the wall, the UWB signal S is attenuated, which leads to a reduction of the radio range, which itself leads to an attenuation of the signal of the direct path. In addition, time of flight time errors are present, which are due to the crossing of the environment.

Indeed, the material slows down the speed of the electromagnetic wave.

The following equation models the attenuation of the signal:

$$P_R \text{ [dBm]} = P_T \text{ [dBm]} + G\text{[dB]} - L\text{[dB]} - 20 \log_{10}(4\pi f_c (d_1+d_2)/c) - L_{MATERIAL}\text{[dB]},$$

where d1 is the distance in free space between the equipment A1 and the wall 15, d2 is the distance in free space between the wall 15 and the equipment A2, and $L_{MATERIAL}$ is the loss in the wall.

The propagation time, according to the distance between the 2 emission and reception points, is calculated from the following formulas:

$$TOF = \frac{d-w}{c} + \frac{w \times R}{c}$$

$$TOF = \frac{d + w \times (R-1)}{c}$$

$$d' = TOF \times c = d + w \times (R-1)$$

where TOF is the time of flight between A1 and A2, d is the physical distance between A1 and A2 in metres, d' is the distance calculated between A1 and A2, c is the speed of light in m/s in free space, the term c/R represents the reduction of speed of the radio signals through the wall, W is the thickness of the wall and R is the refraction index of the wall.

The distance is therefore affected by the following additional factor (relative to a measurement in free space):

$$W \times (R-1).$$

The processing unit 4 thus estimates the approximate refraction index R by calculating:

$$R = \Delta d/W + 1,$$

where $\Delta d$ is the distance error.

Here, the following is found: R=2.5.

Figure 12:
FIG. 12 is a table comprising characteristics of materials which could be used to build a wall.

To identify, from the approximate refraction index of the wall 15, the material with which the wall has been built, the processing unit 4 uses a table such as the table 30 of FIG. 12.

The processing unit 4 identifies, in the table, a consolidated refraction index which is as close as possible to 2.5. Here, this is reinforced concrete, the refraction index of which is equal to 2.73.

The processing unit 4 thus evaluates an actual thickness of the wall from the distance error and from the consolidated refraction index.

The actual thickness of the wall 15 is equal to:

$$W = \Delta d/(2.73-1) = 17 \text{ cm}.$$

Figure 15:
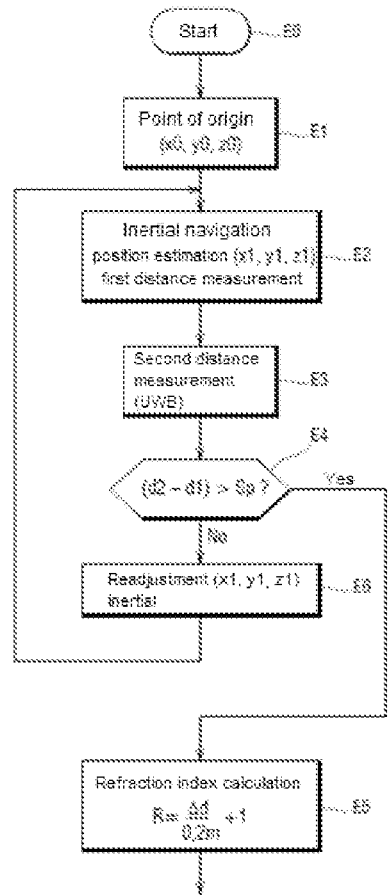
FIG. 15 represents a diagram comprising steps of the obstacle detection and characterisation method according to the invention.

The diagram of FIG. 15 summarises the different steps of the calibration method according to the embodiments.

Following a starting step (step E0), the processing unit 4 implements the initialisation step and defines the point of origin (x0, y0, z0) of the first distance measurements and of the second distance measurements (step E1).

Then, for a given current position of the smartphone 2, the processing unit 4 acquires the position (x1, y1, z1) of the smartphone 2 thanks to the inertial measuring component 9, then estimates the first distance measurement (step E2).

The processing unit 4 then acquires the second distance measurement (step E3).

The processing unit 4 thus evaluates the distance error equal to the difference between the second distance measurement and the first distance measurement, then compares the distance error with the predetermined threshold (step E4).

Thus, if:

$$(d2-d1) = \Delta d > Sp,$$

where d2 is the second distance measurement, d1 is the first distance measurement, $\Delta d$ is the distance error, and Sp is the predetermined threshold, the processing unit 4 detects the presence of an obstacle between the residential gateway 1 and the smartphone 2.

The processing unit 4 thus calculates the refraction index of the wall (step E5):

$$R = \Delta d/W + 1,$$

that is, with W=20 cm:

$$R = \Delta d/0.2m + 1.$$

In step E4, if the condition (d2−d1)>Sp is not verified, the processing unit 4 readjusts the first distance measurement over the second distance measurement (step E6). The method thus returns to step E2.

Now, the way in which the consolidated refraction index is described.

Figures 16, 17:
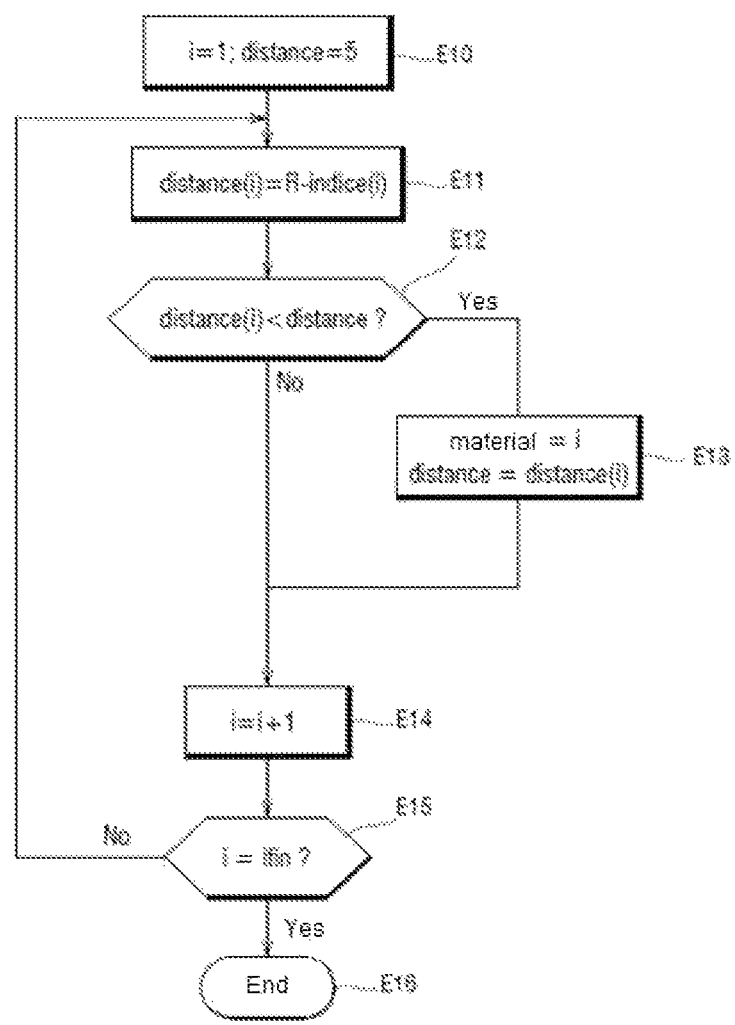
FIG. 16 represents a table comprising predefined refraction indices.
FIG. 17 represents a diagram comprising steps of a method making it possible to determine a consolidated refraction index.

The determination of the consolidated refraction index is illustrated, by considering the table 31 of FIG. 16. The table 31 comprises three predefined refraction indices, each with a separate material. Each predefined refraction index is, in addition, associated with an index varying from 1 to 3 and corresponding to its position in the table 31.

The following variables, constants and functions are used in the algorithm of FIG. 17:

i; ifin (the total number of predefined refraction indices contained in the table, here equal to 3); distance; distance(i); indice(i) and material.

The method starts with an initialisation step during which the variable i is initialised at 1 and the variable distance at 5 (arbitrary value): step E10.

The method thus evaluates a function distance(i) representative of a distance between the approximate refraction index R and the refraction index indice(i), the position of which in the table is equal to i (step E11):

$$distance(i) = R - indice(i).$$

The method thus compares distance(i) with distance.

If distance(i)<distance, then the material variable takes the value of i, and distance takes the value distance(i).

The method goes to step E13, where i is incremented:

$$i = i+1 \text{ (step } E14\text{)}.$$

In step E12, if the condition is not verified, then the method goes directly to step E14.

Then, in step E15, if i=ifin, then the method finishes (step E16). Otherwise, the method returns to step E11.

The determination of the consolidated refraction index therefore consists of determining, from among the predefined refraction indices of table 31, the particular predefined refraction index which minimises a function representative of a distance between the approximate refraction index and the predefined refraction indices.

The processing unit 4 deduces from this that the material which has been used to manufacture the wall is that which, in the table, corresponds to the consolidated refraction index.

It is noted that the function representative of the distance could be different from that described here. For example, the following could be had:

$$d(i) = \sqrt{(R^2 + indice(i)^2)}.$$

This distance is a Euclidean distance which makes it possible to process the cases of negative distances.

Of course, the invention is not limited to the embodiments described, but comprises all variants entering into the scope of the invention such as defined by the claims.

Here, it is described that the application making it possible to implement the obstacle detection and characterisation method according to an embodiment is a local application. In another embodiment, a remote application could also be used. The invention is therefore not necessarily fully implemented in the smartphone, i.e. in the mobile terminal, but could be implemented at least partially in the reference or remote equipment (on a server of the cloud, for example).

The reference equipment is not necessarily a residential gateway, but could be a different equipment item, for example a set-top box. Likewise, the mobile terminal is not necessarily a smartphone, but could be a different equipment item, for example, a tablet.

The architecture of the residential gateway and of the smartphone could be different from those described here. In particular, concerning the smartphone, different functions performed by the processing unit could be implemented by one or more processing components arranged differently.

The time of flight measurements could use signals other than UWB signals: other radio signals, acoustic signals, etc.

It is noted that the values contained in the tables 30 and 31 correspond to the operating frequency of 4 GHz of the UWB modules for measuring TOF. Of course, other frequencies are possible, like for example, the 6.5 GHz strip even the 8 GHz strip. Of course, the indices of the materials of the tables 30 and 31, valid at 4 GHz, will be modified according to measurements taken at these operating frequencies, without the implementations of the embodiments described here being impacted.

The invention claimed is:

1. An obstacle detection and characterisation method, comprising the steps of:
   acquiring at least one pair of measurements, each pair of measurements being associated with a current position of a mobile terminal and comprising a first distance measurement and a second distance measurement between said mobile terminal and a reference equipment item, each first distance measurement being obtained from at least one inertial measurement produced by at least one inertial sensor of the mobile terminal, each second distance measurement being obtained from at least one time of flight measurement;
   for each pair of measurements:
      evaluating a distance error representative of a difference between the second distance measurement and the first distance measurement of said pair of measurements;
      from the distance error, detecting the presence of an obstacle between the mobile terminal and the reference equipment, and determining one or more characteristics of said obstacle,
   wherein the time of flight measurements use ultra wide band (UWB) signals, the reference equipment integrating a UWB anchor,
   wherein the determination of the second distance measurement comprises the steps:
      of acquiring a UWB signal;
      of detecting a first peak of the UWB signal by using a time window centred on a reference time obtained from the first distance measurement;
      of producing the second distance measurement from an occurrence time of the first peak.

2. The obstacle detection and characterisation method according to claim 1, further comprising the step of comparing the distance error with a predetermined threshold, and of detecting the presence of the obstacle if the distance error is greater than the predetermined threshold.

3. The obstacle detection and characterisation method according to claim 1, wherein the obstacle is a wall and wherein the characteristics of the obstacle comprise an indication according to which the wall is a hollow wall or a solid wall and/or a refraction index of the wall and/or a material with which the wall has been built and/or a thickness of the wall.

4. The obstacle detection and characterisation method according to claim 3, further comprising the steps of:
   acquiring a thickness value defined beforehand and likely to correspond to the thickness of the wall;
   calculating an approximate refraction index of the wall from the thickness value defined beforehand and from the distance error;
   determining, in a table containing a plurality of predefined refraction indices, each associated with a predefined material, a consolidated refraction index which is closest to the approximate refraction index, and by deducing from it, the material with which the wall has been built.

5. The obstacle detection and characterisation method according to claim 4, wherein the determination of the consolidated refraction index consists of determining, from among the predefined refraction indices, a particular predefined refraction index which minimizes a function representative of a distance between the approximate refraction index and the predefined refraction indices of the table.

6. The obstacle detection and characterisation method according to claim 5, wherein the distance is a Euclidean distance.

7. The obstacle detection and characterisation method according to claim 4, further comprising the step of evaluating an actual thickness of the wall from the distance error and from the consolidated refraction index.

8. The obstacle detection and characterisation method according to claim 1, further comprising the step, if no obstacle is detected between the mobile terminal and the reference equipment, of readjusting the first distance measurement over the second distance measurement.

9. The obstacle detection and characterisation method according to claim 1, further comprising an initialisation step consisting of defining a point of origin of the first distance measurements and of the second distance measurements, the point of origin being defined when the current position of the mobile terminal is a reference position, wherein the reference equipment is located.

10. The obstacle detection and characterisation method according to claim 9, comprising the step of positioning, by a user, the mobile terminal in the reference position to define the point of origin.

11. The obstacle detection and characterisation method according to claim 9, comprising the step of automatically detecting that the mobile terminal is located in the reference position to define the point of origin.

12. The obstacle detection and characterisation method according to claim 1, wherein the mobile terminal is a smartphone.

13. The obstacle detection and characterisation method according to claim 1, wherein the reference equipment is a residential gateway.

14. A mobile terminal comprising a localisation unit arranged to produce the first distance measurements, a time of flight measuring unit arranged to produce the second distance measurements, and a processing unit, wherein is implemented the obstacle detection and characterisation method according to claim 1.

15. A non-transitory computer readable recording medium, on which a computer program comprising instructions which cause a mobile terminal to execute the steps of the obstacle detection and characterisation method according to claim 1 is recorded.

* * * * *